United States Patent [19]

Sohn

[11] Patent Number: 5,028,941

[45] Date of Patent: Jul. 2, 1991

[54] VIDEO CAMERA SUPPORT STRUCTURE

[76] Inventor: Melvin J. Sohn, 1033 Kensington Ave., Plymouth, Wis. 53073

[21] Appl. No.: 516,123

[22] Filed: Apr. 27, 1990

[51] Int. Cl.$^5$ ............................................. G03B 17/56
[52] U.S. Cl. ...................................... 354/75; 354/81; 358/229
[58] Field of Search ...................... 354/75, 76, 81, 293; 352/243; 358/229

[56] References Cited

U.S. PATENT DOCUMENTS

| | | | |
|---|---|---|---|
| 2,827,841 | 3/1958 | Scarpelli | 95/86 |
| 3,254,868 | 6/1966 | Quaas et al. | 248/176 |
| 3,575,369 | 4/1971 | Tetlow | 248/158 |
| 3,687,030 | 8/1972 | Dine et al. | 95/11 |
| 4,044,377 | 8/1977 | Bowerman | 358/107 |
| 4,377,269 | 3/1983 | Sellner | 248/188.6 |
| 4,437,730 | 3/1984 | Pickett | 350/257 |
| 4,530,580 | 7/1985 | Ueda et al. | 354/82 |
| 4,579,436 | 4/1986 | Jaumann | 354/293 |
| 4,735,389 | 4/1988 | Graham | 248/176 |

*Primary Examiner*—Michael L. Gellner
*Attorney, Agent, or Firm*—Andrus, Sceales, Starke & Sawall

[57] ABSTRACT

A camcorder having a macro lens has a bottom wall with a threaded opening and a spaced alignment opening. An elongate support permits vertical orientation in close spacement to a document or article for copying. The support includes a tubular housing formed of a rigid material with a connector on one end. The connector includes a threaded bolt rotatably mounted and laterally oriented in combination with a projecting locating pin longitudinal spaced of the bolt. The pin and bolt align with the camcorder openings for convenient, releasable interconnection of housing extended longitudinal of the bottom wall. A rod is telescope into the housing, projects outwardly therefrom and terminates in an outer ball of smooth plastic. The inner end of the rod is enlarged to form a bearing and a suitable aluminum bushing in the outer end of the housing provides a smooth rod support. The lower plastic ball provides a low friction support permitting precise location and movement of the camcorder in close spacement to the work with operator viewing in the camcorder eyepiece. The telescopic support is small, compact, and inexpensive, and can be used without necessity of special skills.

15 Claims, 1 Drawing Sheet

U.S. Patent
July 2, 1991
5,028,941
FIG. 1
FIG. 2
FIG. 4
FIG. 3
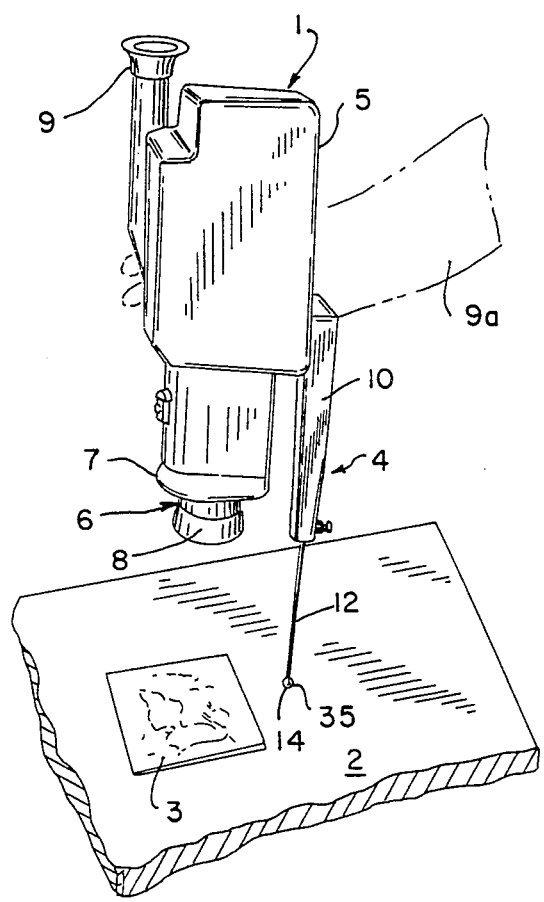
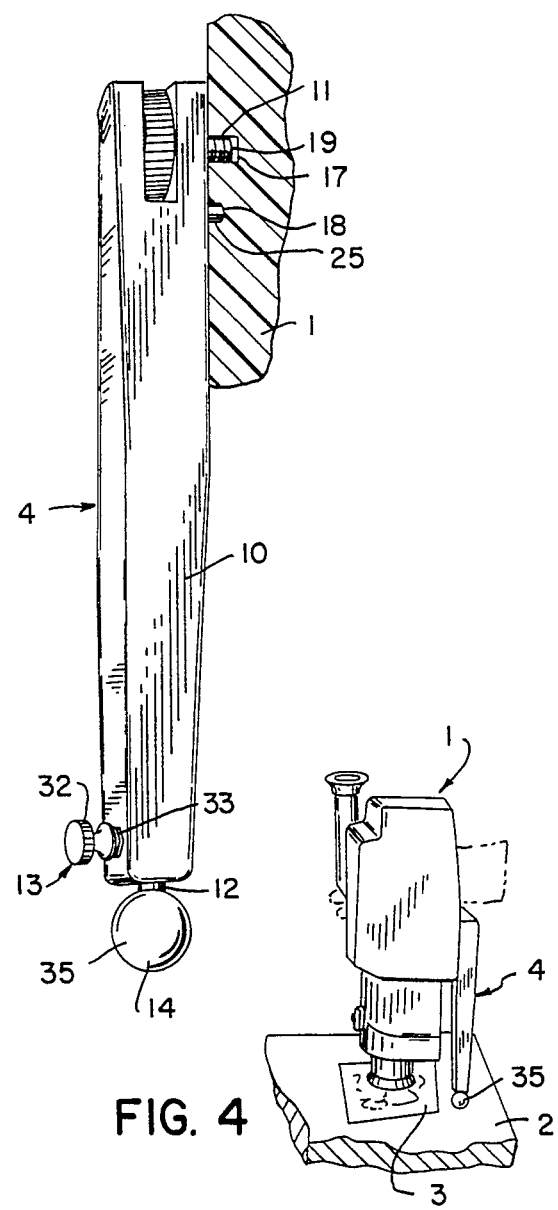
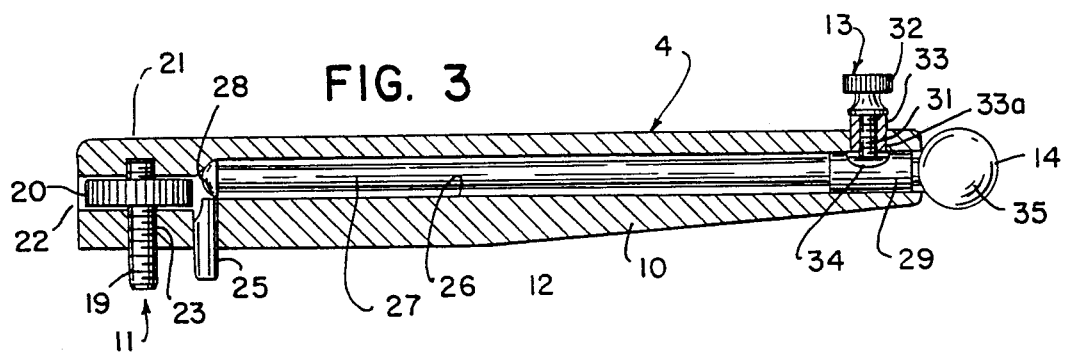

VIDEO CAMERA SUPPORT STRUCTURE

BACKGROUND OF THE INVENTION

This invention relates to a video camera support and particularly to a simple, rigid support for locating of a video camera in close spaced relationship to a substantially fixed article to be recorded.

Video camera generally referred to as a camcorders, are widely used for recording action scenes as well as to record other information on a video tape. The camcorders are small portable video recording devices which are relatively inexpensive products, which has contributed significantly to great acceptance by individual users for home video recording and the like. In addition, copies of other items such as pictures, stamps, information document, special items such as furniture or glassware for insurance purpose are advantageously recorded on the video tapes. The reproduction of small print and objects require close spacing of the camcorder and particularly a macro lens thereof, relative to the small article or work. Manual support of the camcorder presents some difficulties, particularly where the work is supported on a flat horizontal support with the the material to be copied facing upwardly. Although stationary type of supports such as tripods which have been used with cameras are available, such available devices are adapted for horizontal camera orientation, are quite bulky and reasonably costly. Further, tripods are not particularly convenient or suitable for use with a camcorder where the party may have to move the camcorder relative to the work for desired reproduction. Other vertical enlarging support and camera have been used for making enlargements. Such devices are generally in place supports, are not constructed for camcorders and have the various disadvantages of tripods.

The present inventor has recognized the desirability of a small, inexpensive support adapted to be interconnected to a camcorder with a releasable connector to permit the stablized positioning and movement over a supporting surface such that the user can produce a clear close-up taping of the work while permitting rapidly setting the camcorder in relation to the work including moving the camcorder in precise orientation and spacing to the work.

SUMMARY OF THE PRESENT INVENTION

The present invention is particularly directed to an adjustable rigid elongate support having an off-set releasable connector for connection to the camcorder connector used for a conventional tripod. The rigid elongate support projects parallel to the lens of the camcorder and terminates in an outer low friction, and preferably curved support, for accurate positioning relative to the work. The rigid support member is a rod-like unit including a telescopic construction to permit limited adjustment of the spacing of the camcorder's macro lens with respect to the work within a limited range, and preferably a total of substantially eight inches.

More particularly, in accordance with a preferred construction in a practical construction of the present invention, the rigid support includes a connection member formed of a suitable rigid material such as wood, steel, plastic or the like. A camcorder mount or connector includes a threaded screw passing laterally through one end portion of the connector member in combination with a locating pin spaced slightly therefrom in accordance with the standard tripod mount on the camcorder. The pin and screw thus align with the conventional recess and threaded opening on the camcorder and permit the convenient, releasable interconnection of the rigid connector to the camcorder, with the connector extending along the bottom wall of the camcorder housing. A rod member is telescoped into the connector from the outer end thereof and projects outwardly therefrom. The inner end of the rod is enlarged to form a bearing and a suitable bearing member such as an aluminum bushing is secured within the connector's outer end to provide a A curved support member, such as a small ball is secured as by threading to the outermost end of the rod. The lower plastic ball provides a low friction support permitting convenient movement of the camcorder over the work with the operator viewing the work through the conventional camcorder eye piece to thereby assure the desired recording of the work.

The camcorder support unit is small, compact, and provides a highly satisfactory support for locating of the camcorder in close spaced orientation to the work which can be commercially produced at a minimal cost.

BRIEF DESCRIPTION OF THE DRAWINGS

The drawing furnished herewith illustrates the best mode presently contemplated of carrying out the invention.

In the drawing:

FIG. 1 is an elevational view of a camcorder incorporating a locator support illustrating an embodiment of the present invention;

FIG. 2 is an enlarged view of the camcorder locator illustrated in FIG. 1, with a framentary portion of the camcorder shown; and FIG. 3 is a cross-sectional view of the locator shown in FIGS. 1 and 2; and FIG. 4 is a reduced view illustrating an alternate location of the camcorder relative to the work.

DESCRIPTION OF THE PREFERRED EMBODIMENT

Referring to the drawing and particularly to FIG. 1, a camcorder 1 is a diagramatically illustrated located and held in vertical orientation. The camcorder 1 is located in vertically spaced relation to a support, shown as a table 2, on which work 3 to be copied is located. The work 3 may be an object, including a picture or other document, which the user wishes to record on the video tape, not shown, in the camcorder. A rigid locator 4, forming an embodiment of the invention, is releasably connected to the underside or bottom wall 5 of the camcorder 1 and projects outwardly therefrom parallel to the lens structure 6 into supporting engagement with the support table 2. Generally, the present invention is applicable wherein even the camcorder is located substantially aligned with and in close spaced relation to the work. For example, if the work is on a wall or some angled support, the locator 4 can be equally advantageously used. The lens structure 6 includes a rotary support 7, forming a part of the camcorder housing, with a lens 8 suitable to "macro" setting for close up recording of small print, tiny objects and the like. Table 2 locates the work 3 at a convenient location for the user to view the work 3 through the camcorder eyepiece 9 and manually holding of the camcorder 1 with the usual hand supports. The user can manually positions, and moves, the camcorder 1 over the work, as shown above, while activating of the camcorder 1 to record the work 3 on the video tape.

Referring particularly to FIGS. 2 and 3, the locator 4 is an elongated rigid member or assembly including a tubular housing 10 with a releasable connector 11. A rod member 12 is telescoped into the housing 10 for adjustable extension from housing 10 to vary the length of the locator 4 and positioning of the lens 7 relative to the work 3. A releasable rod coupling 13 secures the rod member 12 in fixed, telescoped relation to housing 10. The outer end of the rod member 12 terminates in an outer curved surface 14 for engaging of the table 2. The locator 4 provides a rigid locating support for accurately locating of the camcorder 1 and particularly the lens with respect to the work for faithful reproduction with good resolution. The user will normally manually adjust the lens 7 to the field desired in the macro range, and then, with rod member 12 locked in place, adjust the macro lever while viewing the work 3 through the eyepiece 9. The rod coupling 13, shown as a clamping bolt, is tightened to secure the rod 12 in the desired projected position, and the camcorder 1 operated to record the work in a normal manner. The lower curved support surface 14 not only provides accurate location of the camcorder but establishes convenient, low friction, support and as a result substantially unrestricted movement of the locator and supported camcorder over the work by the user.

The invention is particularly directed to the construction of the locator 4 as a relatively low cost locator device which can be used with a minimal skill required by the operator of the camcorder 1. The camcorder 1 itself is any known or suitable similar construction and is therefor only described in detail where required to provide full and clear understanding of the present invention.

More particularly, illustrative camcorder 1 is shown as a typical available type having a handle not shown, to the one side of the camcorder body or housing for holding and moving of the camcorder 1 while manipulating of appropriate control, (not shown) for turning the camcorder on and off as well as for extending and rechecking of the position of the lens structure the bottom wall or side 5 of the camcorder 1, in accordance with known and conventional construction, is provided with a threaded opening 17 of a standard size and an adjacent locating opening 18. The openings 17 and 18 adapt the unit for mounting upon a conventional tripod, not shown. In accordance with the present invention, the locator 4 includes connector 11 constructed for releasably connection to such a standard tripod mounting system. In particular, the connector 11 is located and constructed forming an integrated part of the one end of the housing 10. A bolt 19 is rotatably journaled within the end of the housing, with the bolt axis projecting laterally of the housing 10. A knurled hand knob 20 is coupled to the bolt 19, as by a small split pin 21 driven through an opening in the knob 20, into fixed connection with the shaft end of the bolt 19. The knob 20 is located within an end recess 22 in the connector end of the housing 10. The bolt 19 has an inner smooth shank 23 rotatable in openings in the recess walls and locked therein by the knob 20. An alignment pin 25 is secured to and projects from the housing 10 and is spaced from bolt 19 in accordance with the tripod locating opening 18 in the bottom wall of the camcorder and thereby locating the support in accurate alignment with lens 8. Threading of the bolt 19 into the threaded hole 17 of the camcorder securely locks the locator 4 projecting parallel to the lens.8

The locator housing 10 is provided with a bore 26 extending from the connector bolt and the rod member 12. The inner end of the rod member 12 is formed with a guide head 28 in the form of an enlargement having a diameter slightly less than that of the bore 26. The rod member 12 projects through the bore 26 and exits through an opening 28a of the housing 10. An aluminum sleeve bearing or bushing 29 is located in the exit opening to support the outer projecting end portion of the rod member 12. The bushing 29, with the head guide 28, provides a smooth, low friction support for the rod member 12.

The coupling 13 is shown including a threaded bolt or pin 31 with a small outer knob 32. The pin 31 is threaded through a small threaded nut 33 which passes through an opening 34 in housing 10 and the bushing 29. A pin 33a is shown driven through the housing 10 and into nut 33 to lock the same in place. The threaded pin 31 is threaded into clamping engagement with rod member 12. The length of the rod 27 is slightly longer than that of the housing bore 26 such that the outer end projects outwardly of the housing. A plastic or other smooth surfaced ball 35 is threaded or otherwise secured thereon to define the outer curved support surface 14. For example, the ball 35 may be conveniently formed of Delrin or other similar material to establish a low friction support, using present day technology both for construction of the assembly and forming of the ball.

The inventor has found that the present invention provides a simple, reliable and inexpensive unit for use with a conventional camcorder. Thus, the user can make faithful and detailed reproduction of various articles, including pictures, photographs or three dimensional objects, for example, for insurance purposes a camcorder tape can provide a reliable record of the detail of objects including significant detail to support the condition of the object, as well as permitting reproduction of pictorial and informational purposes for recording and storage thereof.

Various modes of carrying out the invention are contemplated as being within the scope of the following claims particularly pointing out and distinctly claiming the subject matter regarded as the invention.

I claim:

1. In combination, a manually portable camcorder having a body portion with a bottom wall and a forward lens structure and an eyepiece, said camcorder including mounting elements on the bottom wall, a rigid camcorder support apparatus comprising a rigid connector unit including a mounting unit complementing said card mounting elements for releasable coupling thereto, a rigid member telescoped with said connector unit and projecting forwardly of said lens structure and terminating in an outer locating end, whereby said camcorder is adapted for conventional application in wide spaced relation to objects for video recording and is adapted to be placed in precise and close spaced relation to an object for copying.

2. The combination of claim 1, wherein said connector unit is a tubular elongate member having an inner bore, and said rigid member is a rod member journaled in said bore and projecting longitudinally therefrom.

3. The combination of claim 2 wherein said rod includes a low friction outer end for engaging a support surface substantially in the plane of said object.

4. The combination of claim 2 wherein said elongate member has a width substantially less than alignment with the outer ends of the lens structure.

5. The combination of claim 4 wherein said elongate member is a rigid plastic member and said rod-like member is a metal rod.

6. In combination, a manually portable camcorder having a body portion with a bottom wall and a forward lens structure and a side handle support and operating control section, said camcorder including a threaded mounting hole and an alignment hole on the bottom wall, a camcorder locating support apparatus comprising a rigid connector unit including a mounting bolt projecting laterally through said, connector unit in alignment with said threaded hole and a locating pin aligned with said bolt and spaced to engage said alignment hole, a rigid rod-like member telescoped into said connector unit and projecting forwardly of said lens structure and terminating in a low friction bearing end, means secured to said connector unit and releasably engaging said rod-like member whereby said camcorder is adapted for conventional application in wide spaced relation to objects for video recording and is adapted to be placed with said bearing end engaging an object support for maintaining said lens in precise and close spaced relation to an object.

7. The combination of claim 6, wherein said connector unit is a tubular elongate member having an inner bore receiving said rigid rod-like member.

8. The combination of claim 7 including a ball-member secured to the outer end of said rod-like member and defines said low friction bearing end.

9. The combination of claim 8 wherein said ball-member is a low friction plastic.

10. The combination of claim 9 wherein said elongate member is a rigid plastic member and said rod-like member is a metal rod.

11. A camcorder locating support apparatus for a manually portable camcorder having a body portion with a bottom wall and a forward lens structure and a side handle support and operating control section, said camcorder including a threaded mounting hole and an alignment hole on the bottom wall, said apparatus comprising a rigid connector unit including a mounting bolt projecting laterally through said connector unit for releasable threading into said threaded mounting hole, said connector unit having an alignment pin spaced from the bolt for projection into said alignment hole upon threading of the bolt into said threaded hole, and a rigid member telescoped into said connector and projecting forwardly of said lens structure and terminating in a low friction bearing end, whereby mounting of said support apparatus adapts said camcorder to be placed with said bearing end engaging an object support for maintaining said lens in precise and close spaced relation to an object.

12. The support apparatus of claim 11, wherein said connector unit is a tubular elongate member having an inner bore, said rigid member is a rod-like member having an inner end journaled in said inner bore.

13. The support apparatus of claim 12 having a ball-member secured to the outer end of said rod-like member, said ball-member includes said low friction bearing end.

14. The support apparatus of claim 13 wherein said ball-member is a low friction plastic.

15. The support apparatus of claim 13 wherein said elongate member is a rigid plastic member of said rod-like member is a metal rod.

* * * * *

UNITED STATES PATENT AND TRADEMARK OFFICE
CERTIFICATE OF CORRECTION

PATENT NO. : 5,028,941

DATED : July 2, 1991

INVENTOR(S) : MELVIN J. SOHN

It is certified that error appears in the above-identified patent and that said Letters Patent is hereby corrected as shown below:

Claim 1, Col. 4, Line 56, delete "card"; Claim 4, Col. 5, Line 5, after "than" insert -- said button wall and projects outwardly to substantial --; Claim 6, Col. 5, Line 17, after "said" delete "," (comma).

Signed and Sealed this

Twenty-third Day of March, 1993

Attest:

STEPHEN G. KUNIN

*Attesting Officer*  *Acting Commissioner of Patents and Trademarks*